(12) United States Patent
Byeon et al.

(10) Patent No.: US 12,346,726 B2
(45) Date of Patent: Jul. 1, 2025

(54) TASK SCHEDULING METHOD, AND COMPUTING DEVICE AND APPLICATION PROCESSOR USING THE SAME

(71) Applicant: Samsung Electronics Co., Ltd., Suwon-si (KR)

(72) Inventors: Seyeong Byeon, Suwon-si (KR); Jonglae Park, Anyang-si (KR); Hojin Kim, Seoul (KR); Gurnrack Moon, Seoul (KR); Daeyeong Lee, Seongnam-si (KR); Youngtae Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 696 days.

(21) Appl. No.: 17/529,854

(22) Filed: Nov. 18, 2021

(65) Prior Publication Data

US 2022/0308920 A1 Sep. 29, 2022

(30) Foreign Application Priority Data

Mar. 29, 2021 (KR) .................. 10-2021-0040544
May 12, 2021 (KR) .................. 10-2021-0061642

(51) Int. Cl.
*G06F 9/48* (2006.01)
*G06F 9/50* (2006.01)

(52) U.S. Cl.
CPC .......... *G06F 9/4881* (2013.01); *G06F 9/505* (2013.01); *G06F 9/5088* (2013.01)

(58) Field of Classification Search
CPC ....... G06F 9/4881; G06F 9/5088; G06F 9/505
See application file for complete search history.

(56) References Cited

U.S. PATENT DOCUMENTS

| 8,217,951 | B2 | 7/2012 | Jung |
| 9,311,157 | B2 | 4/2016 | Kim et al. |
| 9,354,944 | B2 | 5/2016 | Gaster et al. |
| 9,378,533 | B2* | 6/2016 | Ro ............................ G06T 1/20 |
| 9,626,295 | B2* | 4/2017 | Park .................... G06F 12/0815 |
| 10,186,007 | B2 | 1/2019 | Barik et al. |
| 10,345,850 | B2* | 7/2019 | Jang ........................ G06F 13/24 |
| 10,430,915 | B2 | 10/2019 | Khodakovsky et al. |
| 2008/0165198 | A1* | 7/2008 | Bakalash .................. G06T 1/20 345/505 |
| 2010/0162253 | A1* | 6/2010 | Jeong .................... G06F 9/4881 718/102 |
| 2012/0188259 | A1* | 7/2012 | Hartog ...................... G06T 1/20 345/503 |
| 2013/0247068 | A1* | 9/2013 | Min ...................... G06F 9/5088 718/105 |
| 2014/0259022 | A1 | 9/2014 | Jung |

(Continued)

FOREIGN PATENT DOCUMENTS

KR 101953906 B1 6/2019

*Primary Examiner* — Kenneth Tang
(74) *Attorney, Agent, or Firm* — Muir Patent Law, PLLC

(57) ABSTRACT

A task scheduling method for a central processing unit (CPU) including a plurality of cores includes receiving a task processing request, obtaining first feedback data for the plurality of cores, obtaining second feedback data for an external intellectual property (IP) block outside the CPU, and assigning a task to at least one of the plurality of cores based on the first feedback data and the second feedback data.

19 Claims, 12 Drawing Sheets

(56) References Cited

U.S. PATENT DOCUMENTS

| | | | |
|---|---|---|---|
| 2015/0067700 A1* | 3/2015 | Kim | G06F 11/3419 |
| | | | 718/107 |
| 2016/0004564 A1* | 1/2016 | Park | G06F 9/5088 |
| | | | 718/104 |
| 2016/0055612 A1* | 2/2016 | Barik | G06F 3/14 |
| | | | 345/522 |
| 2016/0358537 A1* | 12/2016 | Kang | G09G 3/20 |
| 2017/0024316 A1* | 1/2017 | Park | G06F 12/084 |
| 2017/0090988 A1* | 3/2017 | Young | G06F 9/5094 |
| 2017/0148417 A1* | 5/2017 | Lee | G09G 5/008 |
| 2017/0212575 A1* | 7/2017 | Wang | G06F 1/206 |
| 2018/0276044 A1* | 9/2018 | Fong | G06F 9/4881 |
| 2018/0373564 A1* | 12/2018 | Hushchyn | G06F 9/5044 |
| 2019/0087225 A1* | 3/2019 | Rozen | G06F 9/505 |
| 2019/0205170 A1* | 7/2019 | Hushchyn | G06F 9/5061 |
| 2019/0332157 A1* | 10/2019 | Hsu | G06F 1/324 |
| 2020/0043123 A1* | 2/2020 | Dash | G06F 9/5027 |
| 2020/0151008 A1* | 5/2020 | Hilton | G06N 3/08 |
| 2020/0184366 A1* | 6/2020 | Mandal | G06N 3/042 |
| 2020/0371838 A1* | 11/2020 | Mandal | G06F 9/4881 |
| 2021/0018971 A1* | 1/2021 | Rotem | G06F 1/263 |
| 2021/0026696 A1 | 1/2021 | Chen et al. | |
| 2021/0334703 A1* | 10/2021 | Salamat | G06N 20/00 |
| 2022/0035665 A1* | 2/2022 | Foukas | G06F 9/505 |

* cited by examiner

TASK SCHEDULING METHOD, AND COMPUTING DEVICE AND APPLICATION PROCESSOR USING THE SAME

CROSS-REFERENCE TO RELATED APPLICATIONS

This application is based on and claims priority under 35 U.S.C. § 119 to Korean Patent Application Nos. 10-2021-0040544, filed on Mar. 29, 2021, and 10-2021-0061642, filed on May 12, 2021, in the Korean Intellectual Property Office, the disclosures of each of which are incorporated by reference herein in their entireties.

BACKGROUND

The inventive concept relates to a task scheduling method, and a computing device and an application processor using the same, and particularly, to a task scheduling method for multiple cores using feedback data for a plurality of intellectual properties (IPs), and a computing device and an application processor using the same.

In an application processor, a computing device (e.g., a central processing unit (CPU)) including cores having different performances, such as a high-performance core and a low-power core, is applied to guarantee both high performance and low power. Accordingly, scheduling methods for maximizing the performance of cores have been developed. In particular, processing requests for graphics processing unit (GPU)-centric tasks as in a game program have recently increased, and thus, the demand for scheduling methods for maximizing the processing performance of a GPU-centric task has increased.

SUMMARY

The inventive concept provides a task scheduling method for multiple cores using feedback data for a plurality of intellectual properties (IPs), and an electronic device using the same.

According to an aspect of the inventive concept, there is provided a task scheduling method for a plurality of cores, the task scheduling method including: receiving a task processing request; obtaining first feedback data for the plurality of cores; obtaining second feedback data for an external intellectual property (IP) block outside a central processing unit (CPU); and assigning a task to at least one of the plurality of cores based on the first feedback data and the second feedback data.

According to an aspect of the inventive concept, there is provided a computing device including: a plurality of cores; and a control unit configured to control an operation of the computing device, wherein the control unit further receives a task processing request for a first task, obtains first feedback data for the plurality of cores, obtains second feedback data for at least one of a graphics processing unit (GPU) and a display device, and assigns the first task to at least one of the plurality of cores based on the first feedback data and the second feedback data.

According to an aspect of the inventive concept, there is provided an application processor including: a CPU including a plurality of cores; a computing resource; and a display interface, wherein the CPU receives a task processing request for a first task, obtains first feedback data for the plurality of cores, obtains second feedback data for the computing resource and a display device functionally connected through the display interface, and assign the first task to one of the plurality of cores based on the first feedback data and the second feedback data.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
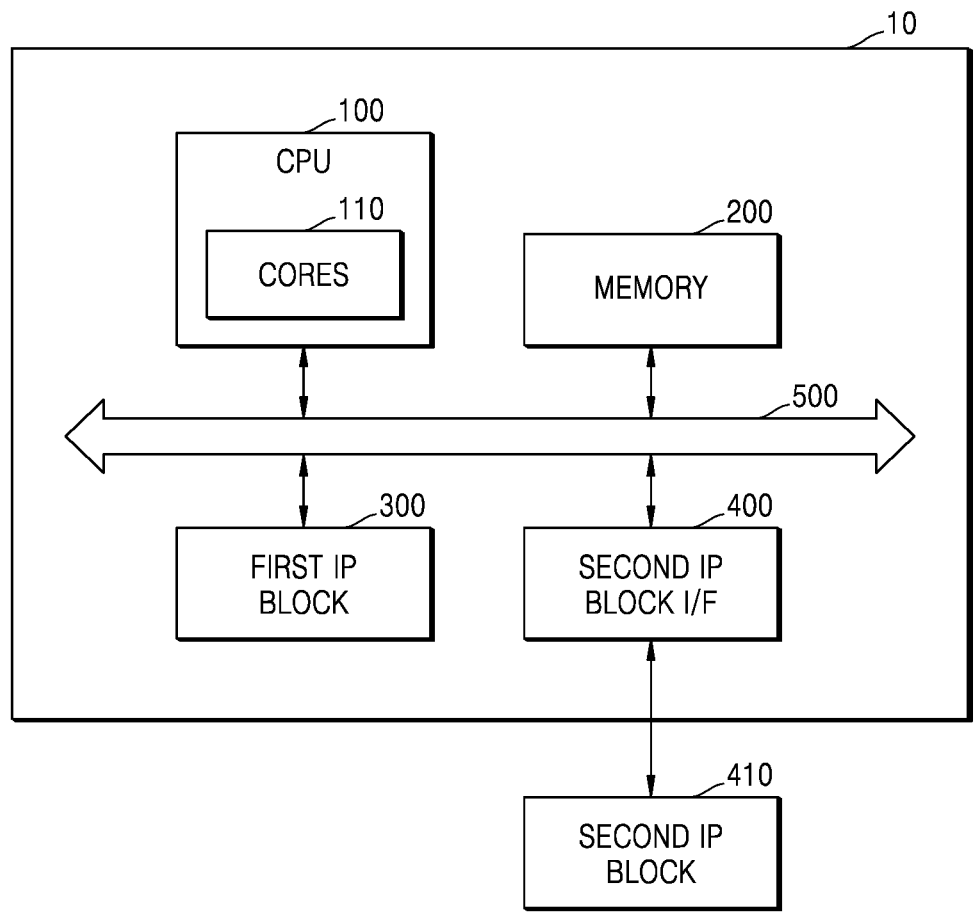
FIG. 1 is a block diagram of an electronic device according to an example embodiment of the inventive concept.

FIG. 1 is a block diagram of an electronic device 10 according to an example embodiment of the inventive concept.

Referring to FIG. 1, the electronic device 10 may include a central processing unit (CPU) 100, a memory 200, a first intellectual property (IP) block 300, and a second IP block interface 400. The components in the electronic device 10 may communicate with each other through a bus 500. The electronic device 10 may be functionally connected to a second IP block 410 through the second IP block interface 400.

The electronic device 10 may be an application processor (AP) employed in a mobile device. In an embodiment, the electronic device 10 may correspond to a computing system, a drone, a robot device such as an advanced drivers assistance system (ADAS), a smart TV, a smartphone, a medical device, a mobile device, an image display device, a measuring device, an Internet of Things (IoT) device, or the like, and may be applied to various other devices.

The CPU 100 controls a general operation of the electronic device 10. The CPU 100 may include a plurality of cores 110. In a non-limiting example, the plurality of cores 110 may include at least one of a dual-core, a triple-core, a quad-core, a hexa-core, and an octa-core. In an embodiment, the plurality of cores 110 may include cores of the same or different performances. For example, the plurality of cores 110 may include a big core of high performance, a little core of low power, and a middle core of medium performance and power. The inventive concept is not limited thereto, and the plurality of cores 110 may be implemented to include only a big core and/or a little core.

The CPU 100 may process or execute programs and/or data stored in the memory 200. In an embodiment, the CPU 100 may control a function of the electronic device 10 by executing the programs stored in the memory 200.

The memory 200 may include at least one of a volatile memory and a nonvolatile memory. The nonvolatile memory includes read-only memory (ROM), programmable ROM (PROM), electrically programmable ROM (EPROM), electrically erasable and programmable ROM (EEPROM), flash memory, phase-change random access memory (PRAM), magnetic RAM (MRAM), resistive RAM (ReRAM), ferroelectric RAM (FeRAM), or the like. The volatile memory includes dynamic RAM (DRAM), static RAM (SRAM), synchronous DRAM (SDRAM), or the like. In an example embodiment, the memory 200 may include at least one of a hard disk drive (HDD), a solid state drive (SSD), a compact flash (CF) card, a secure digital (SD) card, a micro secure digital (micro-SD) card, a mini secure digital (mini-SD) card, an extreme digital (xD) card, and a memory stick.

The CPU 100 is a computing device and may process a task. In an example embodiment, the CPU 100 may receive a task processing request and a task from the outside. The CPU 100 may perform a scheduling operation of assigning the received task to at least one of the plurality of cores 110 in response to the task processing request and transmitting the task to the assigned at least one core. The plurality of cores 110 may process the task received from the CPU 100.

In an example embodiment, the CPU 100 may assign the task to at least one of the plurality of cores 110 based on first feedback data for the plurality of cores 110. Herein, the first feedback data may include utilization indicating a degree of use of each of the plurality of cores 110. The inventive concept is not limited thereto, and the first feedback data may include various pieces of information about each of the plurality of cores 110, such as a processing speed and a waiting time of each of the plurality of cores 110.

The CPU 100 according to an embodiment of the inventive concept may perform a scheduling operation by additionally considering second feedback data for an external IP block in addition to the first feedback data for an internal component (i.e., the plurality of cores 110).

Herein, the external IP block is a component outside the CPU 100 and may indicate at least one component configured to perform subsequent processing based on a task processing result of the CPU 100. The external IP block may include one or more IP blocks according to embodiments, and the external IP block may be a component included in the electronic device 10 or a component separated from the electronic device 10.

For example, referring to FIG. 1, the first IP block 300 may perform first subsequent processing on a first task processing result of the CPU 100, or the second IP block 410 may perform second subsequent processing on a second task processing result of the CPU 100. In an embodiment, the first IP block 300 may generate the second task processing result by performing the first subsequent processing on the first task processing result of the CPU 100, and the second IP block 410 may generate a third task processing result by performing the second subsequent processing on the second task processing result of the first IP block 300. In this case, the first IP block 300 and the second IP block 410 may correspond to the external IP block as described above.

Each of the first IP block 300 and the second IP block 410 may be a computing device such as a graphics processing unit (GPU), a field programmable gate array (FPGA), a digital signal processor (DSP), an image signal processor (ISP), a neural network processing unit (NPU), and a device having a minimum computing function. A particular example of the first IP block 300 and the second IP block 410 is described below with reference to FIGS. 2A and 2B.

The second feedback data may include various kinds of information associated with a state and/or an operation of the external IP block. In an embodiment, the second feedback data may include the same or different pieces of information according to a type of the external IP block. A particular example of the second feedback data is described below with reference to FIGS. 2A and 2B.

As such, the electronic device 10 according to the inventive concept may perform a scheduling operation for the plurality of cores 110 by using the first feedback data for the plurality of cores 110 of the CPU 100, which perform task processing, and the second feedback data for at least one IP block (e.g., the first IP block 300 and the second IP block 410) which performs subsequent processing based on a task processing result of the CPU 100. The electronic device 10 according to the inventive concept performs a scheduling operation by considering all of IPs associated with a task to provide an optimized scheduling function having a high performance per watt.

Although it is shown and has been described in the embodiment of FIG. 1 that the electronic device 10 includes the CPU 100, the memory 200, the first IP block 300, and the second IP block interface 400, the inventive concept is not limited thereto. In an example embodiment, the electronic device 10 may be implemented to omit at least one of the CPU 100, the memory 200, the first IP block 300, and the second IP block interface 400 or include an additional component.

Figure 2A:
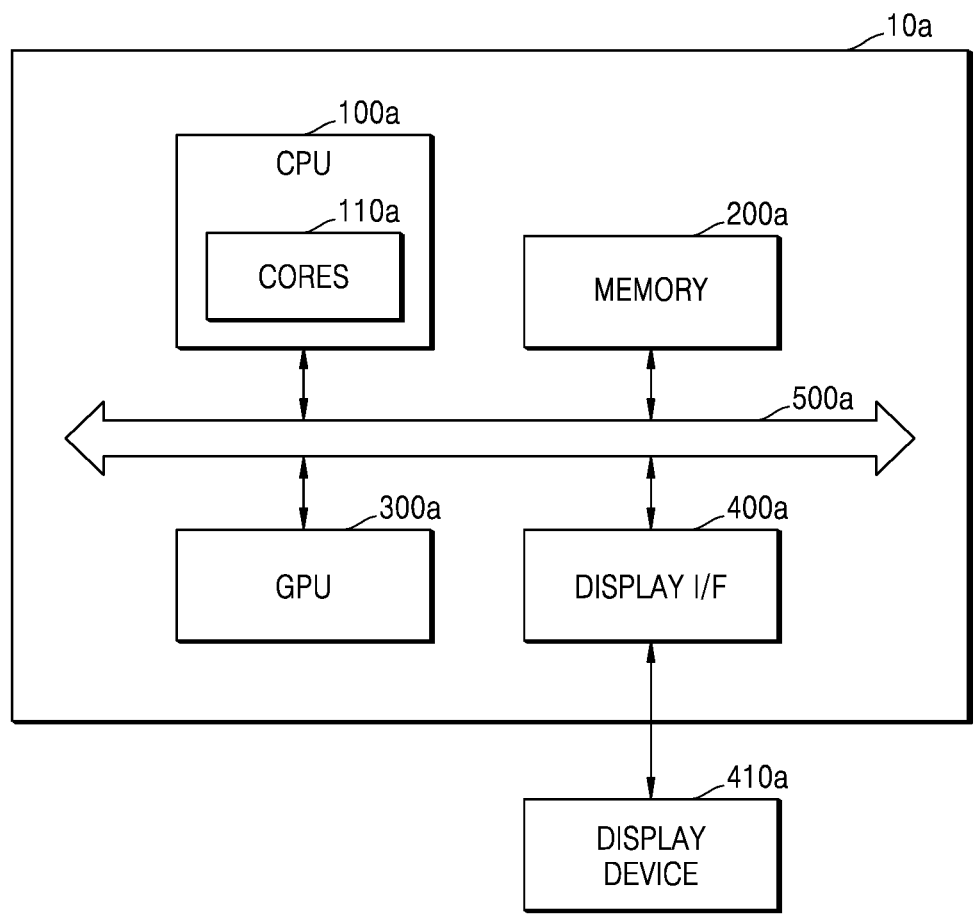
FIG. 2A is a block diagram of an electronic device according to an example embodiment of the inventive concept.
Figure 2B:
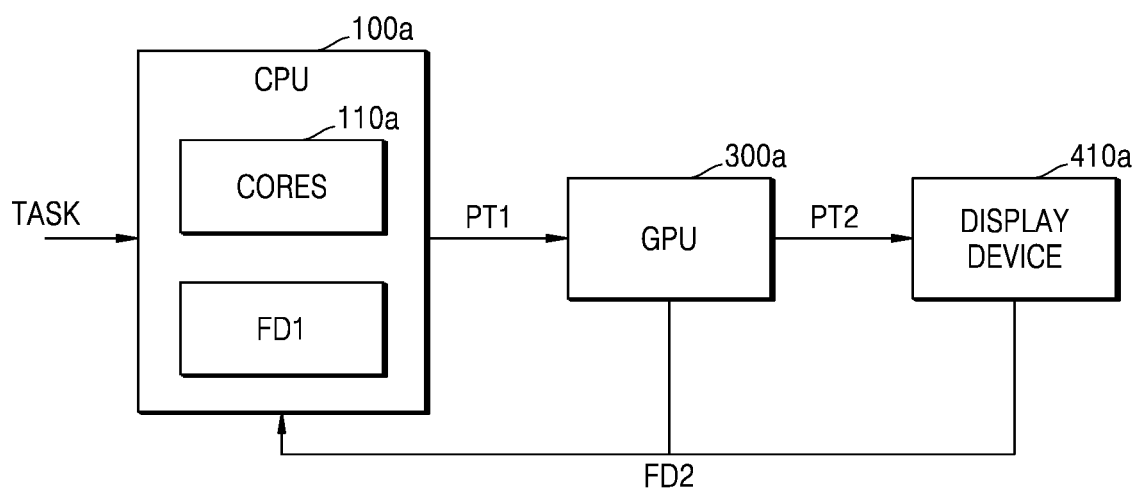
FIG. 2B illustrates a task processing operation according to an example embodiment of the inventive concept.

FIG. 2A is a block diagram of an electronic device 10a according to an example embodiment of the inventive concept, and FIG. 2B illustrates a task processing operation according to an example embodiment of the inventive concept. Particularly, FIGS. 2A and 2B illustrate modifiable embodiments of FIG. 1.

Referring to FIG. 2A, the electronic device 10a may include a CPU 100a including a plurality of cores 110a, a memory 200a, a GPU 300a, and a display interface 400a. The components in the electronic device 10a may communicate with each other through a bus 500a. The electronic device 10a may be functionally connected to a display device 410a through the display interface 400a.

The CPU 100a and the memory 200a of FIG. 2A may correspond to the CPU 100 and the memory 200 of FIG. 1, respectively. The GPU 300a, the display interface 400a, and the display device 410a of FIG. 2A may correspond to the first IP block 300, the second IP block interface 400, and the second IP block 410 of FIG. 1, respectively. Hereinafter, a description made with reference to FIG. 1 is not repeated in a description to be made with reference to FIGS. 2A and 2B.

According to an example embodiment of the inventive concept, the electronic device 10a may receive a GPU-centric task. Herein, the GPU-centric task indicates a task requiring subsequent processing of the GPU 300a. In an embodiment, the CPU 100a may process the GPU-centric task, and the GPU 300a may perform subsequent processing based on a GPU-centric task processing result of the CPU 100. As a non-limiting example, the GPU-centric task may correspond to a task associated with playing a game or the like. In general, the GPU-centric task may be sequentially processed by the CPU 100a, the GPU 300a, and the display device 410a (particularly, a display driver integrated circuit (IC) in the display device 410a). In an embodiment, after at least one of the plurality of cores 110a of the CPU 100a performs the GPU-centric task, the GPU 300a and the display device 410a may perform subsequent processing on a task processing result of the CPU 100a.

For example, referring to FIG. 2B, the CPU 100a may process a GPU-centric task TASK by using the plurality of cores 110a, thereby generating a first task processing result PT1. Thereafter, the GPU 300a may generate a second task processing result PT2 by performing a first subsequent computation on the first task processing result PT1. Thereafter, the display device 410a may perform a second subsequent computation on the second task processing result PT2. The display device 410a may display a third task processing result to a user by performing the second subsequent computation.

Therefore, upon receiving the GPU-centric task TASK, the CPU 100a may obtain first feedback data FD1 for the plurality of cores 110a and second feedback data FD2 for the GPU 300a and the display device 410a. In an example embodiment, the second feedback data FD2 for the GPU 300a and the second feedback data FD2 for the display device 410a may include different pieces of information. For example, the second feedback data FD2 for the GPU 300a may include information about a use rate, a temperature, performance, and the like of the GPU 300a, and the second feedback data FD2 for the display device 410a may include information about frames per second (fps) of the display device 410a. Types of the second feedback data FD2 are not limited to the examples described above.

The CPU 100a may assign the GPU-centric task TASK to at least one of the plurality of cores 110a based on the first feedback data FD1 and the second feedback data FD2. For example, when it is confirmed through the second feedback data FD2 that the fps of the display device 410a are high, the CPU 100a may assign the GPU-centric task TASK to a big core of high performance among the plurality of cores 110a. In an embodiment, when it is confirmed that the utilization of the GPU 300a is high, the CPU 100a may assign the GPU-centric task TASK to a big core of high performance among the plurality of cores 110a to reduce a total processing time for the GPU-centric task TASK. An example of a scheduling operation in which the second feedback data FD2 is considered is not limited to the examples as described above.

Although it is shown and has been described in the embodiments of FIGS. 2A and 2B that the GPU 300a and the display device 410a provide the second feedback data FD2 as the external IP block of FIG. 1, the inventive concept is not limited thereto. For example, it may be implemented that only any one of the GPU 300a and the display device 410a provides the second feedback data FD2 as the external IP block of FIG. 1.

Figure 3:
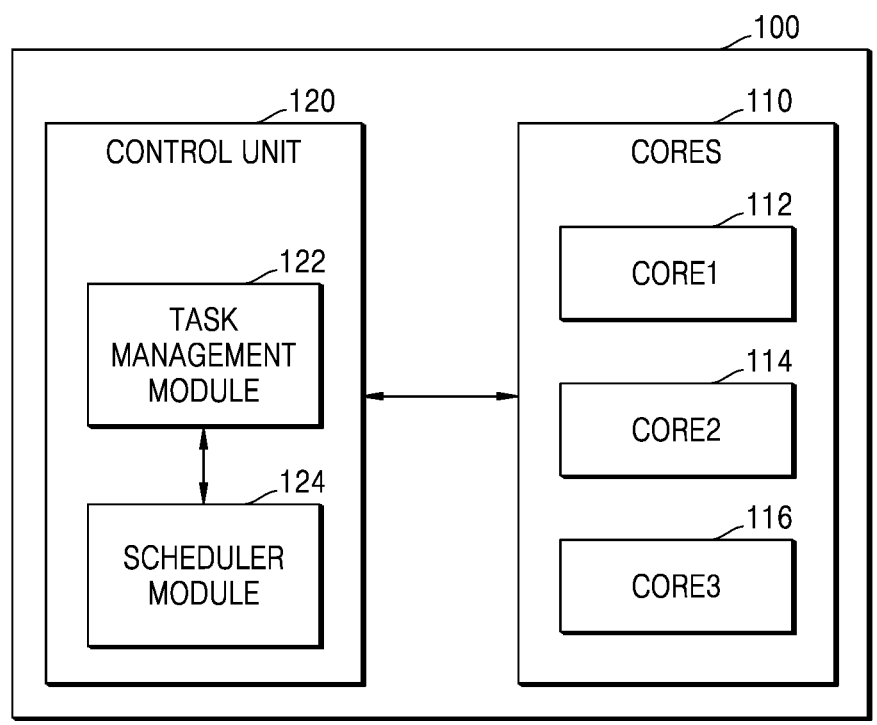
FIG. 3 is a block diagram of a central processing unit (CPU) according to an example embodiment of the inventive concept.

FIG. 3 is a block diagram of a CPU according to an example embodiment of the inventive concept. For example, FIG. 3 is a block diagram of the CPU 100 of FIG. 1. A description to be made with reference to FIG. 3 may also be applied to the CPU 100a of FIG. 2A.

Referring to FIG. 3, the CPU 100 may include the plurality of cores 110 and a control unit 120. In an example embodiment, the plurality of cores 110 may include first, second, and third cores 112, 114, and 116. For example, the first core 112 may be a big core, the second core 114 may be a middle core, and the third core 116 may be a little core. However, the inventive concept is not limited thereto, and each of the first, second, and third cores 112, 114, and 116 may correspond to any one of a big core, a middle core, and a little core.

The control unit 120 may control a general operation of the CPU 100. In an example embodiment, the control unit 120 may include a task management module 122 and a scheduler module 124.

The task management module 122 provides a function of managing a processing-requested task. For example, upon receiving a processing request for a task from the outside, the task management module 122 may analyze the processing-requested task. In an example embodiment, the task management module 122 may analyze the task to obtain various pieces of information such as a type and a size of the task, a type of computation needed to process the task, a priority of the task, and a type of a neural network to be used to process the task. The task management module 122 may provide the obtained information to the scheduler module 124 as task information.

The scheduler module 124 may perform a scheduling operation on the processing-requested task. In an example embodiment, the scheduler module 124 may perform a scheduling operation of assigning the task to at least one of the plurality of cores 110 by using the task information received from the task management module 122.

Each of the task management module 122 and the scheduler module 124 may be implemented by a logic block implemented through logic synthesis, a software block performed by a processor, or a combination thereof. In an example embodiment, each of the task management module 122 and the scheduler module 124 may be a procedure defined as a set of a plurality of instructions executed by the CPU 100 and may be stored in the memory 200.

Figure 4:
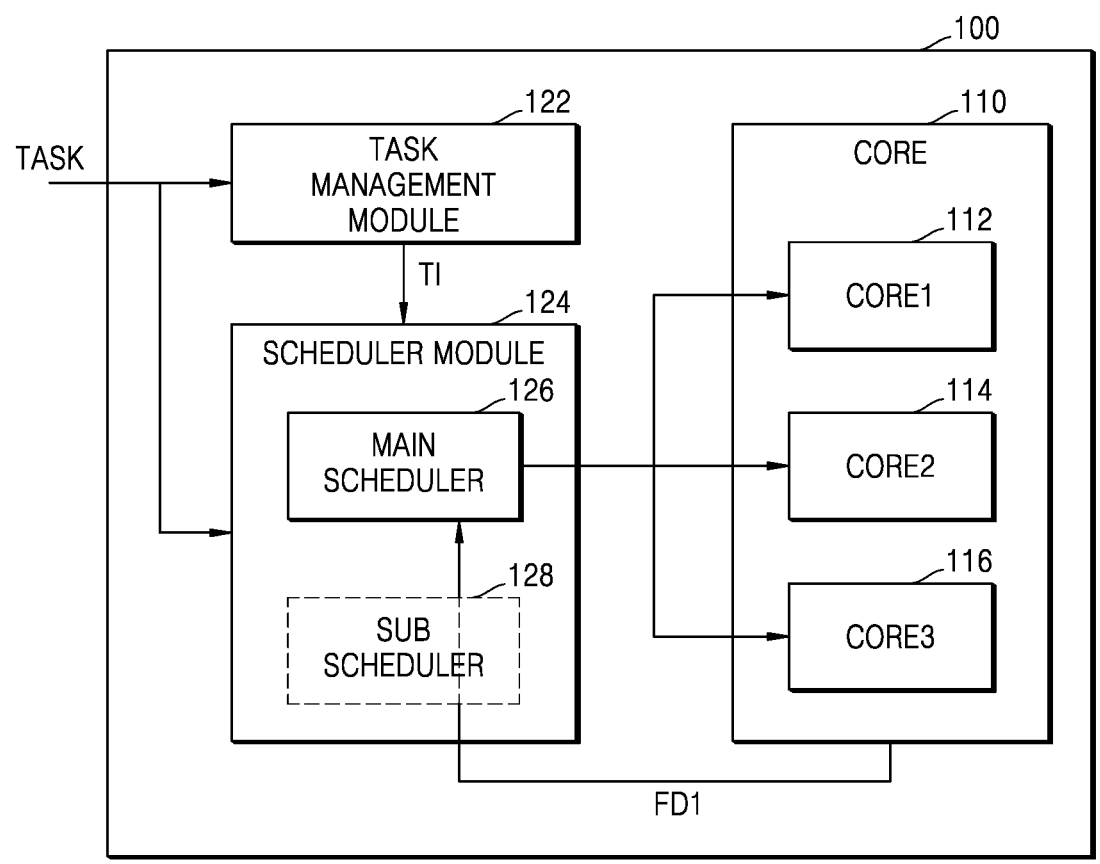
FIGS. 4 and 5 illustrate scheduling operations of a CPU, according to example embodiments of the inventive concept.
Figure 5:
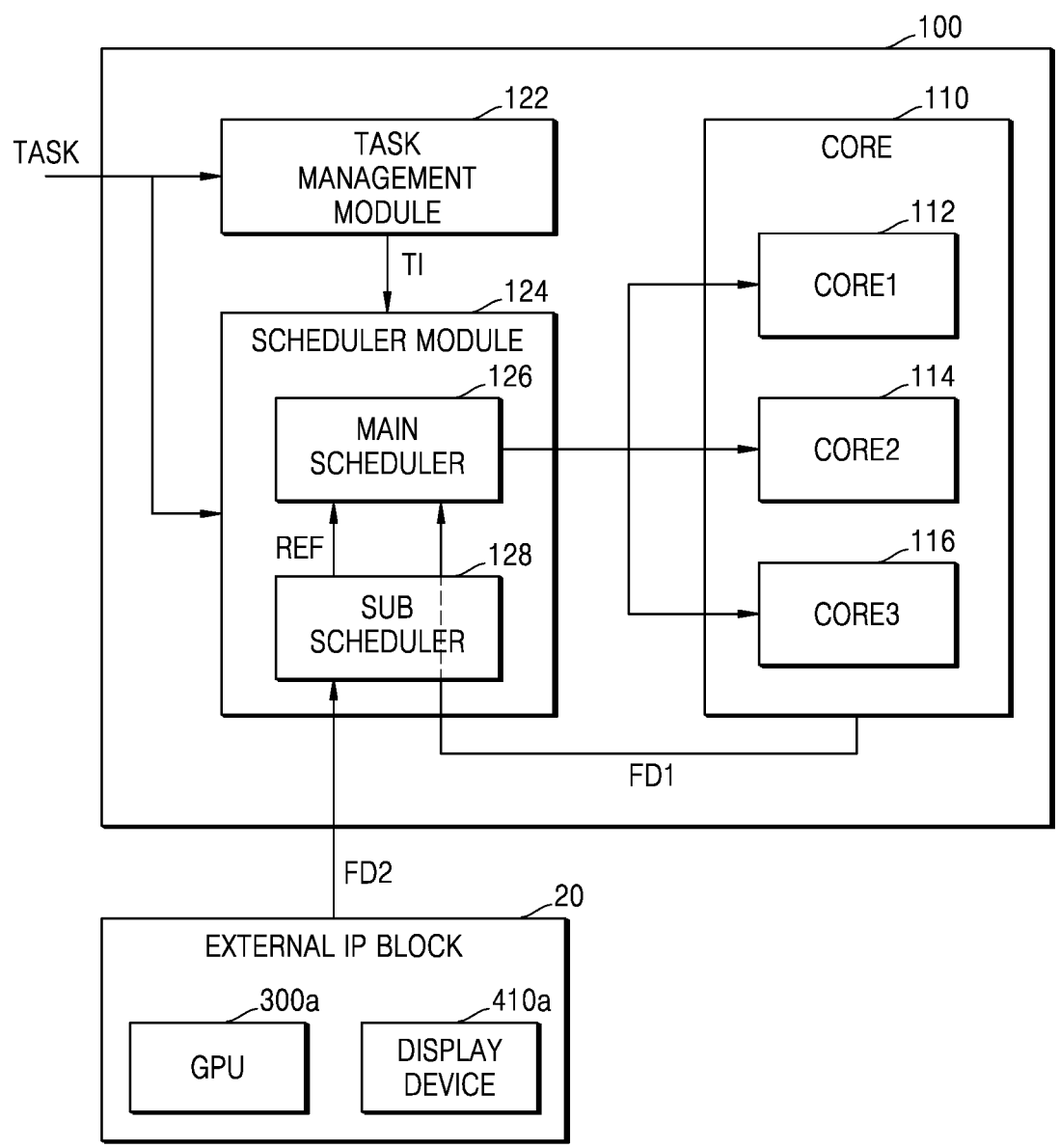

FIGS. 4 and 5 illustrate scheduling operations of a CPU, according to example embodiments of the inventive concept. For example, FIGS. 4 and 5 illustrate scheduling operations of the CPU 100 of FIG. 3.

Referring to FIGS. 4 and 5, the scheduler module 124 may include a main scheduler 126 and a sub scheduler 128. The main scheduler 126 may perform a scheduling operation of assigning a processing-requested task TASK to at least one of the plurality of cores 110 and transmitting the task TASK to the assigned at least one core. The sub scheduler 128 may generate reference data REF which may be referred to for scheduling, and provide the reference data REF to the main scheduler 126.

Each of the main scheduler 126 and the sub scheduler 128 may be implemented by a logic block implemented through logic synthesis, a software block performed by a processor, or a combination thereof. In an example embodiment, each of the main scheduler 126 and the sub scheduler 128 may be a procedure defined as a set of a plurality of instructions executed by the CPU 100 and may be stored in the memory 200.

In an example embodiment, the scheduler module 124 may perform a scheduling operation according to two schemes. For example, the scheduler module 124 may perform a scheduling operation according to a first scheme of performing scheduling by using the first feedback data FD1 for the plurality of cores 110 or a second scheme of performing scheduling by using the first feedback data FD1 and the second feedback data FD2 for external IP blocks.

FIG. 4 illustrates a scheduling operation according to the first scheme. Referring to FIG. 4, the CPU 100 may receive the task TASK. The task management module 122 may generate task information TI by analyzing the task TASK and provide the generated task information TI to the scheduler module 124.

The main scheduler 126 may obtain the first feedback data FD1 for each of the first, second, and third cores 112, 114, and 116 from the plurality of cores 110. The main scheduler 126 may assign the task TASK to at least one of the first, second, and third cores 112, 114, and 116 based on the obtained first feedback data FD1.

In an example embodiment, the main scheduler 126 may assign the task TASK to at least one of the first, second, and third cores 112, 114, and 116 based on the task information TI received from the task management module 122 and the first feedback data FD1. For example, the main scheduler 126 may assign the task TASK to at least one of the first, second, and third cores 112, 114, and 116 based on a priority of the task TASK and the utilization of each of the plurality of cores 110.

However, the inventive concept is not limited thereto, and the main scheduler 126 may perform scheduling by using only the first feedback data FD1 or perform scheduling by using additional information in addition to the task information TI and the first feedback data FD1. In the first scheme, the sub scheduler 128 may maintain a standby state.

FIG. 5 illustrates a scheduling operation according to the second scheme of the CPU 100. Referring to FIG. 5, the sub scheduler 128 may obtain the second feedback data FD2 for an external IP block 20. In an example embodiment, the external IP block 20 may include the GPU 300*a* and/or the display device 410*a* of FIG. 2A. For example, the sub scheduler 128 may receive the second feedback data FD2 for the GPU 300*a* from the GPU 300*a* through the bus 500*a* of FIG. 2A. The sub scheduler 128 may receive the second feedback data FD2 for the display device 410*a* from the display device 410*a* through the display interface 400*a* of FIG. 2A.

In an example embodiment, the sub scheduler 128 may periodically receive the second feedback data FD2 from the external IP block 20. However, the inventive concept is not limited thereto, and the sub scheduler 128 may aperiodically receive the second feedback data FD2 from the external IP block 20. For example, the sub scheduler 128 may be implemented to receive the second feedback data FD2 from the external IP block 20 when a processing request for the task TASK is received.

The sub scheduler 128 may generate the reference data REF based on the second feedback data FD2 for the external IP block 20. The reference data REF may include information about a performance requirement identified based on the second feedback data FD2. The performance requirement may vary according to a type of the external IP block 20. In an example embodiment, the sub scheduler 128 may generate the reference data REF by using the task information TI received from the task management module 122. The sub scheduler 128 may transmit the generated reference data REF to the main scheduler 126.

The main scheduler 126 may obtain the first feedback data FD1 for the plurality of cores 110 as described in the first scheme and obtain the reference data REF from the sub scheduler 128. The main scheduler 126 may assign the task TASK to at least one of the first, second, and third cores 112, 114, and 116 based on the first feedback data FD1 and the reference data REF. In an example embodiment, the main scheduler 126 may check a core matched with the performance requirement of the reference data REF among the plurality of cores 110 based on the first feedback data FD1 and assign the task TASK to the checked core. For example, the main scheduler 126 may choose a core among the plurality of cores 110 based on the first feedback data FD1 and the performance requirement of the reference data REF.

Timings at which the first feedback data FD1 and the second feedback data FD2 are obtained may be different from each other. For example, the first feedback data FD1 may be obtained in a shorter period than the second feedback data FD2. Therefore, according to an embodiment, the main scheduler 126 may be implemented to first perform scheduling according to the first scheme and perform, when the reference data REF is received from the sub scheduler 128, scheduling according to the second scheme. For example, the main scheduler 126 may perform scheduling according to the first scheme and then correct the scheduling performed according to the first scheme, by using the received reference data REF. In an example embodiment, the main scheduler 126 may correct the scheduling performed according to the first scheme, so that the corrected scheduling is matched with the performance requirement checked based on the reference data REF. In an embodiment, the main scheduler 126 may correct, if a core assigned by the first scheme does not meet the performance requirement of the reference data REF, the scheduling performed according to the first scheme, so that the corrected scheduling may assign the task TASK to another core which may meet the performance requirement checked based on the reference data REF. For example, after the main scheduler 126 assigns the task TASK to the third core 116 that is a little core for low power in the first scheme, if the reference data REF indicating a high performance requirement is received, the main scheduler 126 may reassign the task TASK to the first core 112 which meets the high performance requirement of the reference data REF.

However, the inventive concept is not limited thereto, and the main scheduler 126 may be implemented to wait until the first feedback data FD1 and the reference data REF are received and perform, when both the first feedback data FD1 and the reference data REF are received, scheduling according to the second scheme.

Although it is shown and has been described in the embodiments of FIGS. 4 and 5 that the main scheduler 126 and the sub scheduler 128 are individual components, the inventive concept is not limited thereto. For example, the main scheduler 126 and the sub scheduler 128 may be implemented as one scheduler. In this case, the one scheduler may receive both the first feedback data FD1 and the second feedback data FD2 and perform scheduling for the plurality of cores 110.

Figure 6:
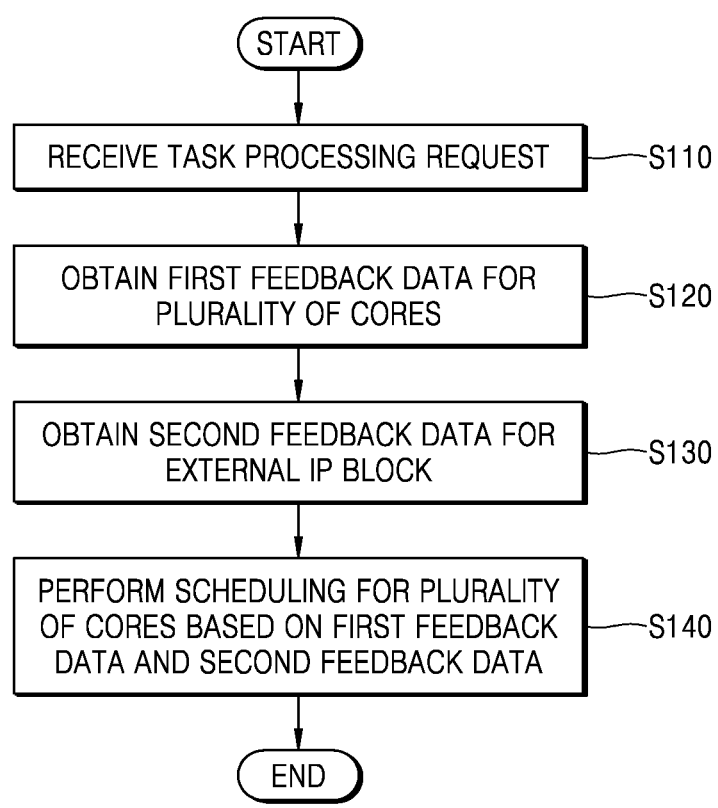
FIG. 6 is a flowchart of a task scheduling method according to an example embodiment of the inventive concept.

FIG. 6 is a flowchart of a task scheduling method according to an example embodiment of the inventive concept. For example, FIG. 6 is a flowchart of a task scheduling method of the CPU 100 of FIG. 1. A description to be made with reference to FIG. 6 is also applicable to a task scheduling method of the CPU 100*a* of FIG. 2A.

Referring to FIG. 6, in operation S110, the CPU 100 may receive a task processing request. For example, the CPU 100 may receive the task processing request together with a task. In an example embodiment, the received task may be a GPU-centric task which requires subsequent processing of a GPU.

In operation S120, the CPU 100 may obtain first feedback data for the plurality of cores 110. In an embodiment, the CPU 100 may obtain first feedback data from the plurality of cores 110. For example, the CPU 100 may receive first feedback data for each of the plurality of cores 110 from the plurality of cores 110. In an example embodiment, the first feedback data may include utilization indicating a degree of use of each of the plurality of cores 110, and according to embodiments, the first feedback data may further include additional information such as a processing speed and a waiting time of each of the plurality of cores 110.

In operation S130, the CPU 100 may obtain second feedback data for an external IP block. For example, the CPU 100 may obtain second feedback data for at least one external IP block configured to perform subsequent processing based on a task processing result of the CPU 100. In an embodiment, the CPU 100 may obtain the second feedback data from the external IP block. In an example embodiment, the second feedback data may include information corresponding to a type of the external IP block. For example, second feedback data for a GPU may include information about a use rate, a temperature, performance, and the like of the GPU, and second feedback data for a display device may include information about fps of the display device. A type of the second feedback data is not limited to the examples described above.

In operation S140, the CPU 100 may perform scheduling for the plurality of cores 110 based on the first feedback data and the second feedback data. For example, the CPU 100 may assign the received task to at least one of the plurality of cores 110 based on the first feedback data and the second feedback data and transmit the received task to the assigned core.

Figure 7:
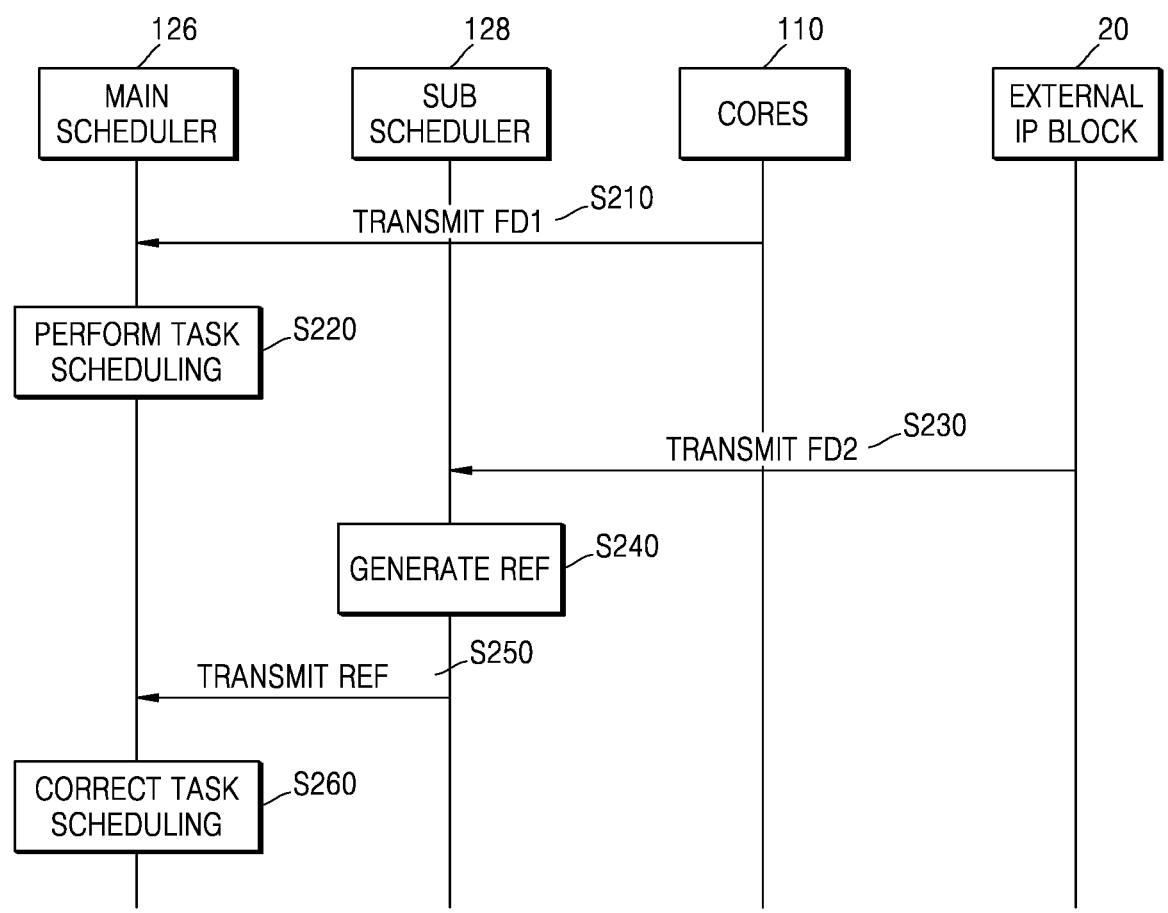
FIG. 7 is a sequence diagram of a task scheduling operation according to an example embodiment of the inventive concept.

FIG. 7 is a sequence diagram of a task scheduling operation according to an example embodiment of the inventive concept. For example, FIG. 7 is a sequence diagram of a task scheduling method of the CPU 100 of FIGS. 4 and 5.

Referring to FIG. 7, in operation S210, the plurality of cores 110 may transmit the first feedback data FD1 for the plurality of cores 110 to the main scheduler 126. For example, the plurality of cores 110 may transmit the first feedback data FD1 for the plurality of cores 110 to the main scheduler 126 periodically or in response to a request of the main scheduler 126. Feedback data from each core may be collectively referred to as the first feedback data FD1.

In operation S220, the main scheduler 126 may perform task scheduling by using the first feedback data FD1. In an example embodiment, the main scheduler 126 may check utilization of each of the plurality of cores 110 based on the first feedback data FD1 and assign a task to at least one of the plurality of cores 110 according to the checked utilization. The main scheduler 126 may transmit the task to the assigned at least one core.

In operation S230, the external IP block 20 may transmit the second feedback data FD2 for the external IP block 20 to the sub scheduler 128. In an example embodiment, the external IP block 20 may transmit the second feedback data FD2 for the external IP block 20 to the sub scheduler 128 periodically or in response to a request of the sub scheduler 128. The external IP block 20 may include one or more IP blocks. For example, when the external IP block 20 includes a plurality of IP blocks, the second feedback data FD2 may include feedback data for each of the plurality of IP blocks. Feedback data from each IP block may be collectively referred to as the second feedback data FD2.

In operation S240, the sub scheduler 128 may generate the reference data REF by using the second feedback data FD2. In an example embodiment, the sub scheduler 128 may generate the reference data REF including information about a performance requirement identified based on the second feedback data FD2. In operation S250, the sub scheduler 128 may transmit the reference data REF to the main scheduler 126.

In operation S260, the main scheduler 126 may correct the task scheduling based on the reference data REF. In an example embodiment, the main scheduler 126 may correct the existing task scheduling based on the reference data REF, so that the corrected task scheduling is matched with the performance requirement. For example, the main scheduler 126 may reassign the task to another core instead of the assigned at least one core. In an example embodiment, the main scheduler 126 may correct, if a core assigned by the first scheme does not meet the performance requirement of the reference data REF, the existing task scheduling based on the reference data REF, so that the corrected task scheduling may assign the task TASK to another core which may meet the performance requirement of the reference data REF. For example, the main scheduler 126 may reassign the task to another core instead of the assigned at least one core.

As described above, the CPU 100 may perform a scheduling operation considering both the first feedback data FD1 and the second feedback data FD2 in a first scheme of performing scheduling by using the first feedback data FD1 and then in a second scheme of correcting the scheduling by using the second feedback data FD2.

Although it is shown and has been described in the embodiment of FIG. 7 that the main scheduler 126 obtains the first feedback data FD1 and then the sub scheduler 128 obtains the second feedback data FD2, the inventive concept is not limited thereto. For example, it may be implemented that the sub scheduler 128 first obtains the second feedback data FD2 and then the main scheduler 126 obtains the first feedback data FD1. In this case, the main scheduler 126 may receive the reference data REF from the sub scheduler 128, perform scheduling by using the reference data REF, and then correct the scheduling by using the first feedback data FD1.

Figure 8:
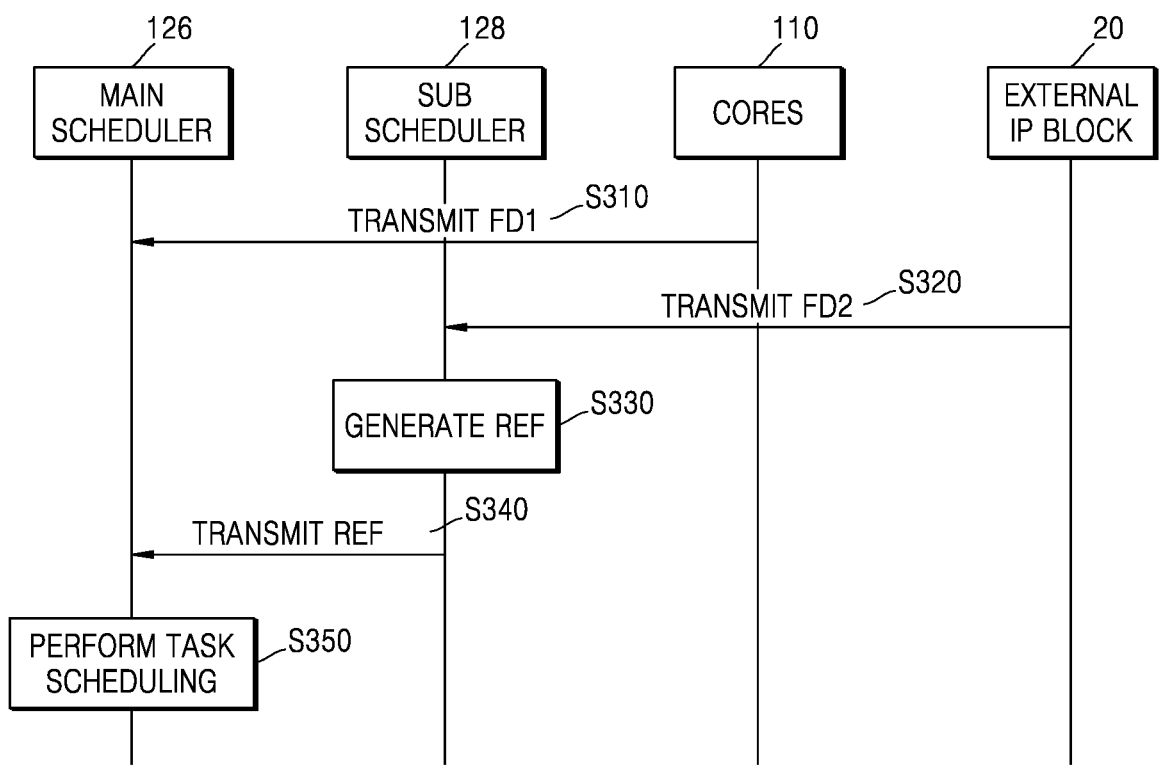
FIG. 8 is a sequence diagram of a task scheduling operation according to an example embodiment of the inventive concept.

FIG. 8 is a sequence diagram of a task scheduling operation according to an example embodiment of the inventive concept. For example, FIG. 8 is a sequence diagram of a task scheduling method of the CPU 100 of FIGS. 4 and 5.

Referring to FIG. 8, in operation S310, the plurality of cores 110 may transmit the first feedback data FD1 for the plurality of cores 110 to the main scheduler 126. For example, the plurality of cores 110 may transmit the first feedback data FD1 for the plurality of cores 110 to the main scheduler 126 periodically or in response to a request of the main scheduler 126. Feedback data from each core may be collectively referred to as the first feedback data FD1.

In operation S320, the external IP block 20 may transmit the second feedback data FD2 for the external IP block 20 to the sub scheduler 128. In an example embodiment, the external IP block 20 may transmit the second feedback data FD2 for the external IP block 20 to the sub scheduler 128 periodically or in response to a request of the sub scheduler 128. The external IP block 20 may include one or more IP blocks. For example, when the external IP block 20 includes a plurality of IP blocks, the second feedback data FD2 may include feedback data for each of the plurality of IP blocks. Feedback data from each IP block may be collectively referred to as the second feedback data FD2.

In operation S330, the sub scheduler 128 may generate the reference data REF by using the second feedback data FD2. In an example embodiment, the sub scheduler 128 may generate the reference data REF including information about a performance requirement identified based on the second feedback data FD2. In operation S340, the sub scheduler 128 may transmit the reference data REF to the main scheduler 126.

In operation S350, the main scheduler 126 may perform task scheduling by using the first feedback data FD1 and the reference data REF. In an example embodiment, the main scheduler 126 may check utilization of each of the plurality of cores 110 based on the first feedback data FD1 and check a performance requirement based on the reference data REF. The main scheduler 126 may assign a task to at least one of the plurality of cores 110 according to the checked utilization of each of the plurality of cores 110 and the checked performance requirement. The main scheduler 126 may transmit the task to the assigned at least one core among the plurality of cores 110.

As described above, the CPU 100 may perform a scheduling operation considering both the first feedback data FD1 and the second feedback data FD2 in a scheme of performing scheduling after obtaining both the first feedback data FD1 and the second feedback data FD2.

Although it is shown and has been described in the embodiment of FIG. 8 that the main scheduler 126 obtains the first feedback data FD1 and then the sub scheduler 128 obtains the second feedback data FD2, the inventive concept is not limited thereto. For example, it may be implemented that the sub scheduler 128 first obtains the second feedback data FD2 and then the main scheduler 126 obtains the first feedback data FD1.

Figure 9:
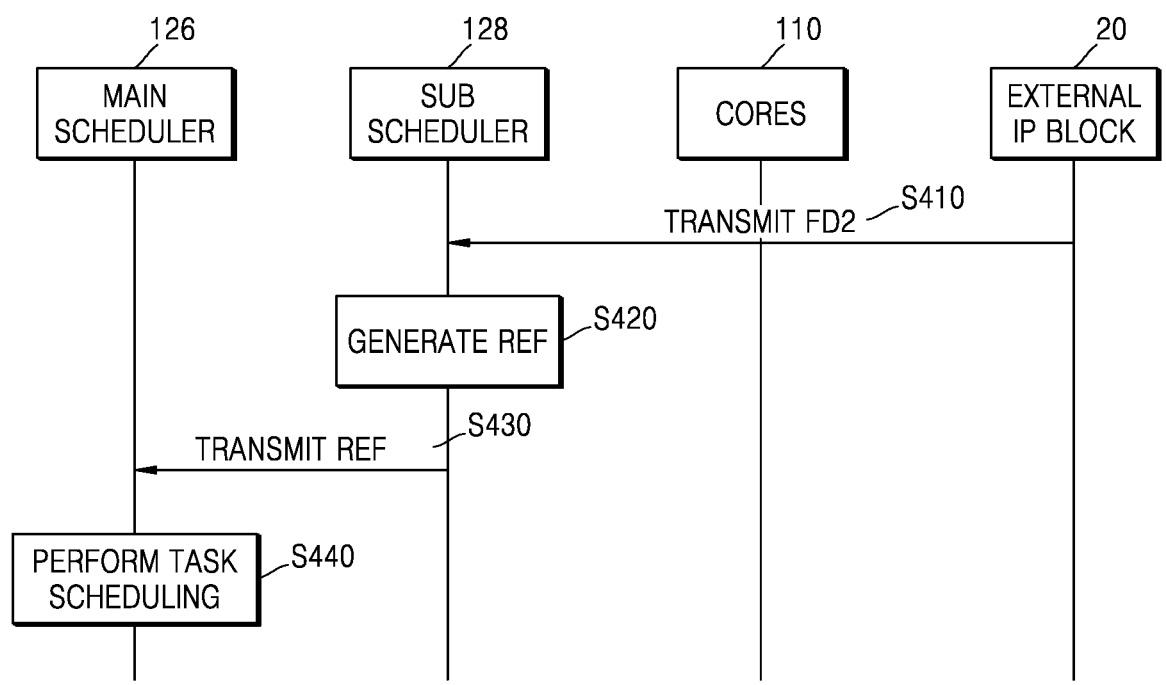
FIG. 9 is a sequence diagram of a task scheduling operation according to an example embodiment of the inventive concept.

FIG. 9 is a sequence diagram of a task scheduling operation according to an example embodiment of the inventive concept. For example, FIG. 9 is a sequence diagram of a task scheduling method of the CPU 100 of FIGS. 4 and 5.

Referring to FIG. 9, in operation S410, the external IP block 20 may transmit the second feedback data FD2 for the external IP block 20 to the sub scheduler 128. In an example embodiment, the external IP block 20 may transmit the second feedback data FD2 for the external IP block 20 to the sub scheduler 128 periodically or in response to a request of the sub scheduler 128. The external IP block 20 may include one or more IP blocks. For example, when the external IP block 20 includes a plurality of IP blocks, the second feedback data FD2 may include feedback data for each of the plurality of IP blocks. Feedback data from each IP block may be collectively referred to as the second feedback data FD2.

In operation S420, the sub scheduler 128 may generate the reference data REF by using the second feedback data FD2. In an example embodiment, the sub scheduler 128 may generate the reference data REF including information about a performance requirement identified based on the second feedback data FD2. In operation S430, the sub scheduler 128 may transmit the reference data REF to the main scheduler 126.

In operation S440, the main scheduler 126 may perform tack scheduling by using the reference data REF. In an example embodiment, the main scheduler 126 may check a performance requirement based on the reference data REF. The main scheduler 126 may assign a task to at least one of the plurality of cores 110 according to the checked performance requirement. The main scheduler 126 may transmit the task to the assigned at least one core among the plurality of cores 110.

As described above, the CPU 100 may perform a scheduling operation by using only the second feedback data FD2.

Although it is shown and has been described in the embodiments of FIGS. 7 to 9 that the main scheduler 126 and the sub scheduler 128 are individual components, the inventive concept is not limited thereto. For example, the main scheduler 126 and the sub scheduler 128 may be implemented as one scheduler, and operations S250, S340, and S430 of transmitting the reference data REF may be omitted.

Although it is shown and has been described in the embodiments of FIGS. 7 to 9 that, upon receiving the second feedback data FD2, the sub scheduler 128 generates the reference data REF and transmits the reference data REF to the main scheduler 126, the inventive concept is not limited thereto. For example, according to embodiments, even though the sub scheduler 128 generates the reference data REF, the sub scheduler 128 may not transmit the reference data REF to the main scheduler 126. A particular description thereof is described below with reference to FIG. 10.

Figure 10:
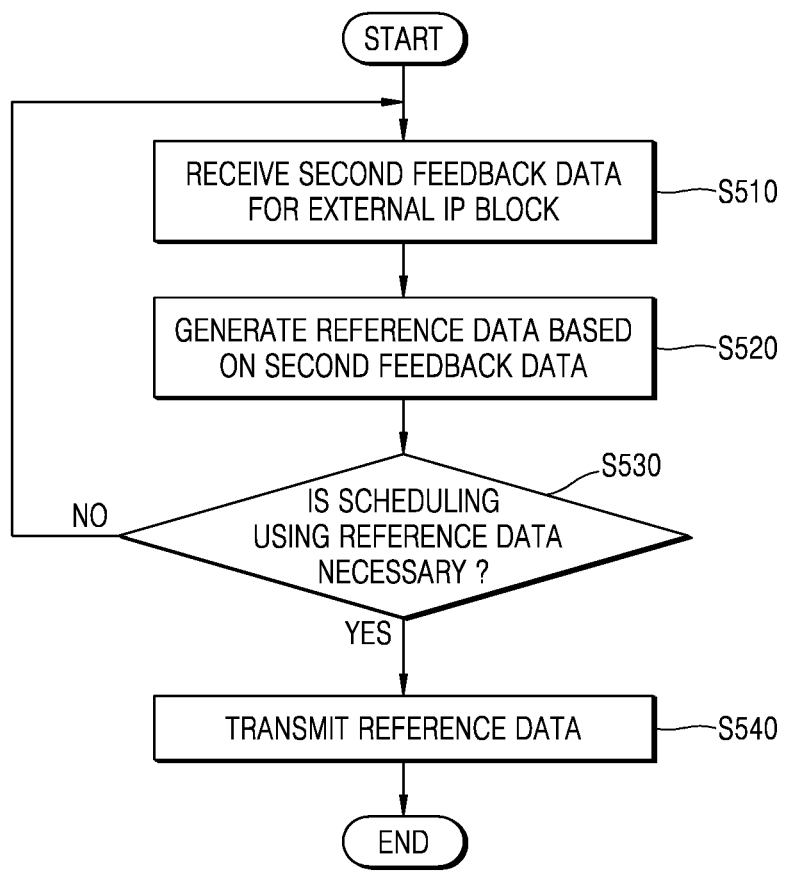
FIG. 10 is a flowchart of an operation of a sub scheduler according to an example embodiment of the inventive concept.

FIG. 10 is a flowchart of an operation of a sub scheduler according to an example embodiment of the inventive concept. For example, FIG. 10 is a flowchart of an operation of the sub scheduler 128 of FIGS. 4 and 5.

Referring to FIG. 10, in operation S510, the sub scheduler 128 may receive the second feedback data FD2 for the external IP block 20. In operation S520, the sub scheduler 128 may generate the reference data REF based on the second feedback data FD2. The reference data REF may include information about a performance requirement identified based on the second feedback data FD2.

In operation S530, the sub scheduler 128 may determine whether scheduling using the reference data REF is necessary. For example, the sub scheduler 128 may determine whether scheduling using the reference data REF is necessary, according to whether the performance requirement checked based on the reference data REF requires a higher level of performance than a preset performance requirement. For example, at the preset performance requirement of 60 fps, if the checked performance requirement is 120 fps, the sub scheduler 128 may determine that scheduling using the reference data REF is necessary, and if the checked performance requirement is 60 fps, the sub scheduler 128 may determine that scheduling using the reference data REF is not necessary. An operation of determining whether scheduling using the reference data REF is necessary is not limited to the example described above, and various schemes may be applied thereto.

If it is determined that scheduling using the reference data REF is necessary (S530—YES), the sub scheduler 128 may transmit the reference data REF to the main scheduler 126 in operation S540. The main scheduler 126 may perform a scheduling operation by using the reference data REF. For example, upon receiving the reference data REF after performing scheduling based on the first feedback data FD1, the main scheduler 126 may correct the existing scheduling by using the reference data REF. As an example, upon obtaining both the first feedback data FD1 and the reference data REF, the main scheduler 126 may assign a task to at least one of the plurality of cores 110.

Otherwise, if it is determined that scheduling using the reference data REF is not necessary (S530—NO), the sub scheduler 128 may repeat operation S510. The main scheduler 126 may perform scheduling based on the first feedback data FD1.

As described above, the sub scheduler 128 may selectively transmit second feedback data for an external IP block to the main scheduler 126. For example, the sub scheduler 128 may selectively transmit the second feedback data according to whether a performance requirement identified based on the second feedback data for the external IP block is needed to be reflected on a scheduling operation of the main scheduler 126.

Figure 11:
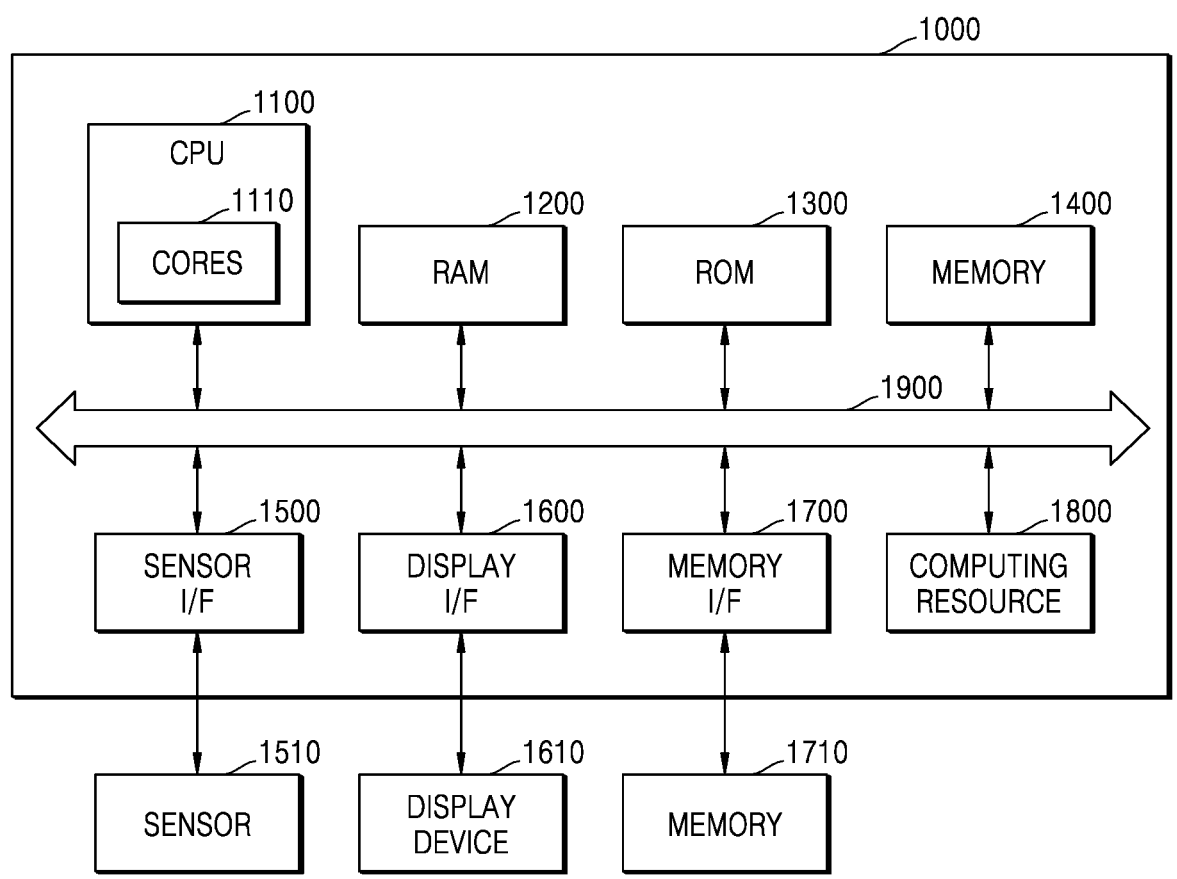
FIG. 11 is a block diagram of an application processor according to an example embodiment of the inventive concept.

FIG. 11 is a block diagram of an AP 1000 according to an example embodiment of the inventive concept.

Referring to FIG. 11, the AP 1000 may include a CPU 1100, RAM 1200, ROM 1300, a memory 1400, a sensor interface 1500, a display interface 1600, a memory interface 1700, and a computing resource 1800. Besides the above, the AP 1000 may further include a communication module, and the components in the AP 1000 may be transmit and receive data to and from each other through a bus 1900.

The CPU 1100 may control a general operation of the AP 1000. The CPU 1100 may include a plurality of cores 1110. The CPU 1100 may process or execute programs and/or data stored in the memory 1400. In an example embodiment, the CPU 1100 may control a function of the AP 1000 by executing the programs stored in the memory 1400.

The RAM 1200 may temporarily store programs, data, and/or instructions. According to embodiments, the RAM 1200 may be implemented by DRAM or SRAM. The RAM 1200 may temporarily store data input and output through the sensor interface 1500, the display interface 1600, and the memory interface 1700 or generated by the computing resource 1800 or the CPU 1100.

The ROM 1300 may store programs and/or data to be continuously used. The ROM 1300 may be implemented by EPROM, EEPROM, or the like.

The computing resource 1800 may perform a computation processing on various kinds of data. For example, the computing resource 1800 may perform subsequent processing on data processed by the plurality of cores 1110, perform a computation processing on data stored in the memory 1400, perform image processing on image data received through the sensor interface 1500, or perform a computation processing on data received through the memory interface 1700.

In an example embodiment, the computing resource 1800 may include n computing resources (n is a positive integer). The computing resource 1800 may include various computation processing devices such as a CPU, a GPU, an AP, a DSP, an FPGA, an NPU, an electronic control unit (ECU), and an ISP. When a plurality of computing resources 1800 are included, the plurality of computing resources 1800 may include the same or different types of computation processing devices.

Data processed by the computing resource 1800 may be stored in the memory 1400, provided to a display device 1610 through the display interface 1600, or stored in an external memory 1710 through the memory interface 1700.

The sensor interface 1500 may interface data (e.g., image data, voice data, and the like) input from a sensor 1510 connected to the AP 1000.

The display interface 1600 may interface data (e.g., an image) output to the display device 1610. The display device 1610 may output an image or data of the image through a display such as a liquid crystal display (LCD) and an active matrix organic light-emitting diode (AMOLED) display.

The memory interface 1700 may interface data input from the external memory 1710 outside the AP 1000 or data output to the external memory 1710. According to embodiments, the external memory 1710 may be implemented by a volatile memory such as DRAM or SRAM or a nonvolatile memory such as ReRAM, PRAM, or NAND flash. The external memory 1710 may be implemented by a memory card (a multimedia card (MMC), an embedded MMC (eMMC), an SD card, or a micro-SD card), or the like.

The CPU 1100 may correspond to the CPU (100 or 100a) of FIGS. 1 to 10. The CPU 1100 may obtain first feedback data for the plurality of cores 1110 and second feedback data for external IP blocks (e.g., the computing resource 1800, the sensor 1510, the display device 1610, the external memory 1710, and the like), perform a scheduling operation of assigning a task to at least one of the plurality of cores 1110 based on the first feedback data and the second feedback data, and transmit the task to the assigned at least one core. Example embodiments of the CPU 1100 have been described above, and thus, descriptions of the CPU 1100 are omitted herein.

While the inventive concept has been particularly shown and described with reference to embodiments thereof, it will be understood that various changes in form and details may be made therein without departing from the spirit and scope of the following claims.

What is claimed is:

1. A task scheduling method for a central processing unit (CPU) including a plurality of cores and a scheduler, the task scheduling method comprising:
receiving, by the scheduler of the CPU, a task processing request;
obtaining, by the scheduler of the CPU, first feedback data for the plurality of cores;
obtaining, by the scheduler of the CPU, second feedback data for an external intellectual property (IP) block outside the CPU, wherein the second feedback data are received from the external IP block;
generating, by a sub-scheduler module of the scheduler of the CPU, reference data comprising a performance requirement based on the second feedback data; and
assigning, by a main scheduler module of the scheduler of the CPU, a task to at least one of the plurality of cores based on the first feedback data and the reference data.

2. The task scheduling method of claim 1, further comprising:
performing the task by the at least one of the plurality of cores and generating a task processing result; and
performing, by at least one IP block of the external IP block, subsequent processing of the task.

3. The task scheduling method of claim 2,
wherein the external IP block comprises at least one of a graphics processing unit (GPU) and a display device, and
wherein the second feedback data comprises at least one of feedback data for the GPU and feedback data for the display device.

4. The task scheduling method of claim 3,
wherein the second feedback data for the GPU comprises information about at least one of a use rate, a temperature, and performance of the GPU, and
wherein the second feedback data for the display device comprises information about frames per second (fps) of the display device.

5. The task scheduling method of claim 1,
wherein the obtaining of the second feedback data comprises periodically receiving the second feedback data from the external IP block.

6. The task scheduling method of claim 1,
wherein the first feedback data comprises utilization of each of the plurality of cores, and
wherein the utilization indicates a degree of use of each of the plurality of cores.

7. The task scheduling method of claim 6,
wherein the assigning of the task to the at least one of the plurality of cores comprises:
assigning the task to a first core of the plurality of cores based on the first feedback data; and correcting the assigning of the task to the first core based on the second feedback data.

8. The task scheduling method of claim 7, wherein the correcting of the assigning of the task to the first core comprises:
if the first core is determined as not meeting the performance requirement and a second core of the plurality of cores meets the performance requirement, assigning the task to the second core of the plurality of cores.

9. The task scheduling method of claim 6, wherein the assigning of the task to the at least one of the plurality of cores comprises:
checking whether the plurality of cores include a first core meeting the performance requirement based on the first feedback data;
assigning the task to the first core; and
transmitting the task to the first core.

10. The task scheduling method of claim 1, wherein the plurality of cores comprise a first core, a second core, and a third core, and
wherein the first core, the second core, and the third core are different from each other in a degree of performance.

11. A computing device comprising:
a plurality of cores; and
a control unit configured to control an operation of the computing device,
wherein the control unit is further configured to:
receive a task processing request for a first task;
obtain first feedback data for the plurality of cores;
obtain second feedback data for at least one of a graphics processing unit (GPU) and a display device, wherein the control unit receives the second feedback data from the at least one of the GPU and the display device; and
assign the first task to at least one of the plurality of cores based on the first feedback data and reference data, and
wherein the control unit comprises:
 a main scheduler module configured to assign the first task to the at least one of the plurality of cores; and
 a sub-scheduler module configured to generate the reference data comprising a performance requirement based on the second feedback data.

12. The computing device of claim 11, wherein the second feedback data for the GPU comprises information about at least one of a use rate, a temperature, and performance of the GPU, and
wherein the second feedback data for the display device comprises information about frames per second (fps) of the display device.

13. The computing device of claim 11, wherein the main scheduler module is further configured to:
 receive the reference data from the sub-scheduler module; and
 assign the first task to the at least one of the plurality of cores based on the reference data and the first feedback data.

14. The computing device of claim 11, wherein the main scheduler module is further configured to:
 receive the reference data from the sub-scheduler module;
 assign the first task to a first core of the plurality of cores based on the first feedback data; and
 if the first core is determined as not meeting the performance requirement, assign the first task to a second core of the plurality of cores based on the reference data.

15. The computing device of claim 11, wherein the sub-scheduler module is further configured to:
 determine whether the performance requirement of the reference data requires a higher level of performance than a preset performance requirement to generate a determination result; and
 transmit the reference data to the main scheduler module according to the determination result.

16. The computing device of claim 15, wherein the sub-scheduler module is further configured:
to transmit the reference data to the main scheduler module if the performance requirement of the reference data requires a higher level of performance than the preset performance requirement; and
not to transmit the reference data to the main scheduler module if the performance requirement of the reference data does not require a higher level of performance than the preset performance requirement.

17. The computing device of claim 11, wherein the first feedback data comprises utilization of each of the plurality of cores.

18. The computing device of claim 11, wherein the plurality of cores comprise a first core, a second core, and a third core, and
wherein the first core, the second core, and the third core are different from each other in a degree of performance.

19. An application processor comprising:
a central processing unit (CPU) comprising a plurality of cores;
a computing resource outside the CPU; and
a display interface configured to communicate with a display device outside the application processor,
wherein the CPU is configured to:
receive a task processing request for a first task;
obtain first feedback data for the plurality of cores;
obtain second feedback data for the computing resource and the display device functionally connected through the display interface, wherein the CPU receives the second feedback data from the computing resource and from the display device through the display interface; and
assign the first task to one of the plurality of cores based on the first feedback data and reference data, and
wherein the CPU comprises:
 a main scheduler module configured to assign the first task to the one of the plurality of cores; and
 a sub-scheduler module configured to generate the reference data comprising a performance requirement based on the second feedback data.

* * * * *